United States Patent [19]
Anderson

[11] 3,962,962
[45] June 15, 1976

[54] SYSTEM AND HOT CABINET SERVER

[76] Inventor: William G. Anderson, 5942 Gildred Circle, Huntington Beach, Calif. 92647

[22] Filed: Oct. 3, 1974

[21] Appl. No.: 511,625

[52] U.S. Cl. .................................. 99/474; 99/483; 312/31; 312/236
[51] Int. Cl.² .......................................... A47F 3/04
[58] Field of Search ............ 99/474, 475, 476, 483; 312/236, 237, 31, 214

[56] References Cited
UNITED STATES PATENTS
3,747,513  7/1973  Seelbach .............................. 99/476

FOREIGN PATENTS OR APPLICATIONS
1,484,923  5/1967  France ................................ 99/476
   54,540  10/1934  Norway ............................... 99/475

Primary Examiner—Peter Feldman
Assistant Examiner—Alan Cantor

[57] ABSTRACT

A system and Hot Cabinet server therefor to condition pre-packaged foods and to maintain them at serving temperature during storage and for customer access. A structural relationship of means is provided in cooperatively related bin type cabinets to combine the inherent principles of convection, conduction and recirculation to maximum advantage and to the end that heat loss is minimized despite the completely open and accessible bin configuration. The cabinets are each a self-sufficient entity when supplied with power such as an electrical plug in, and each is completely mobile while in operation; and being of the same height and width configuration, they are adapted to be quickly assembled in service lines that are readily modified or broken down for storage.

12 Claims, 7 Drawing Figures

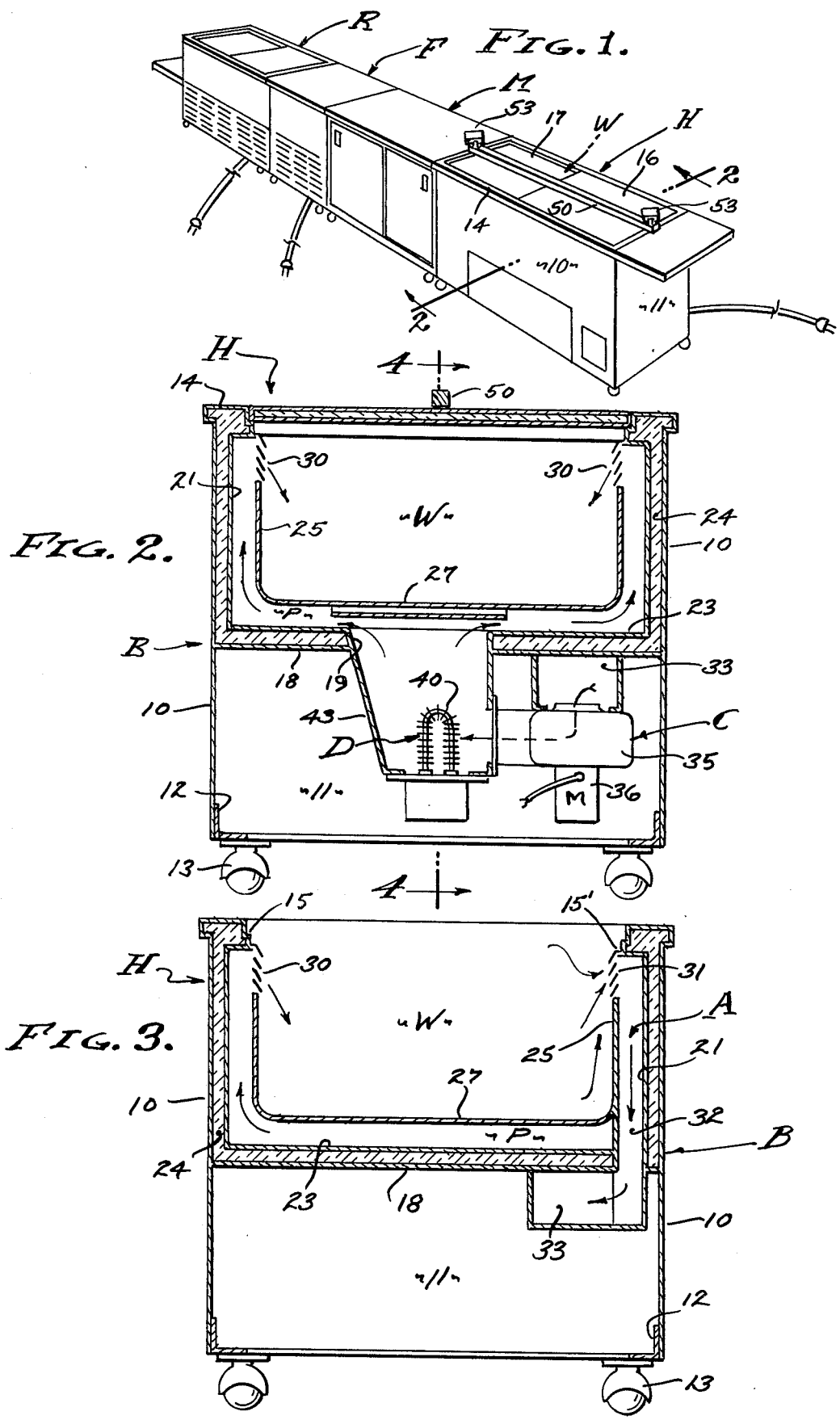

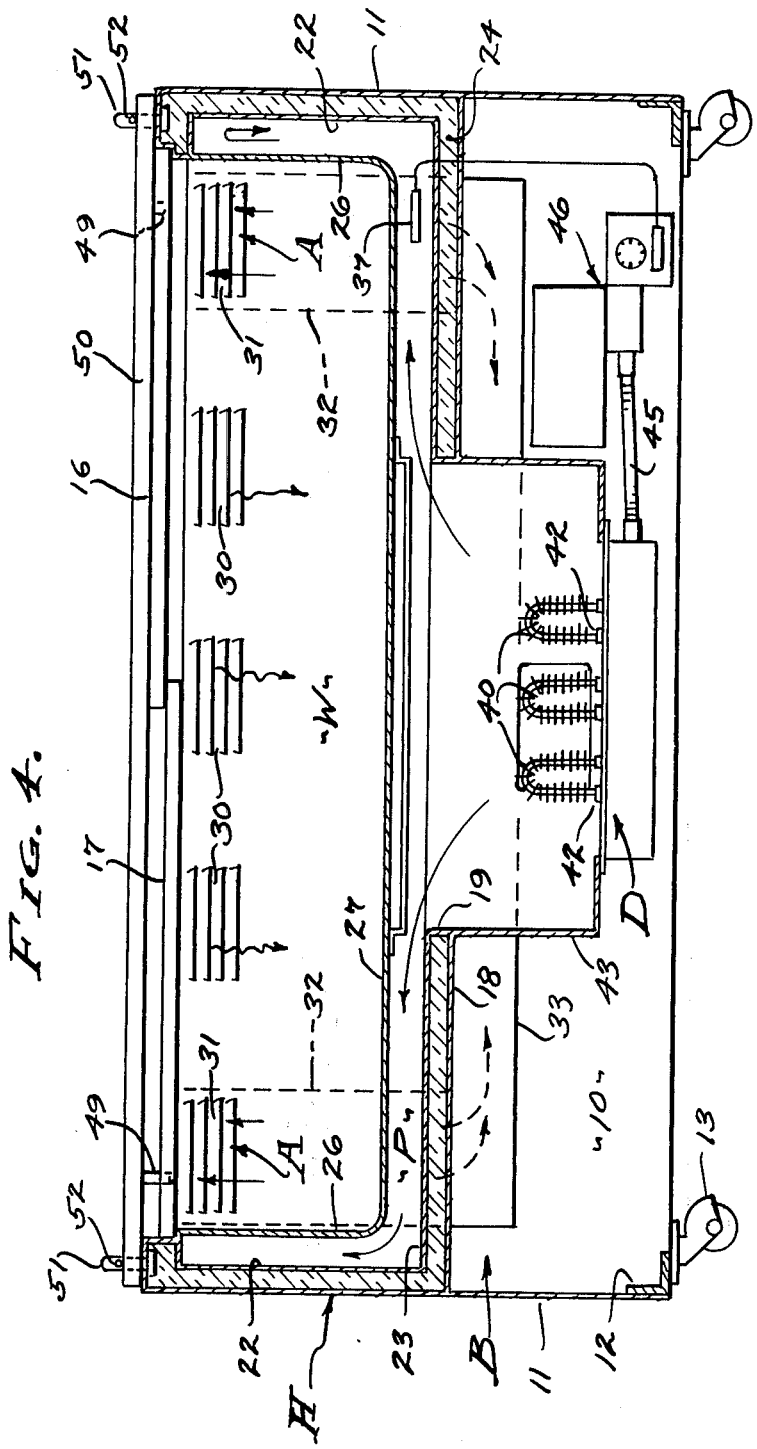

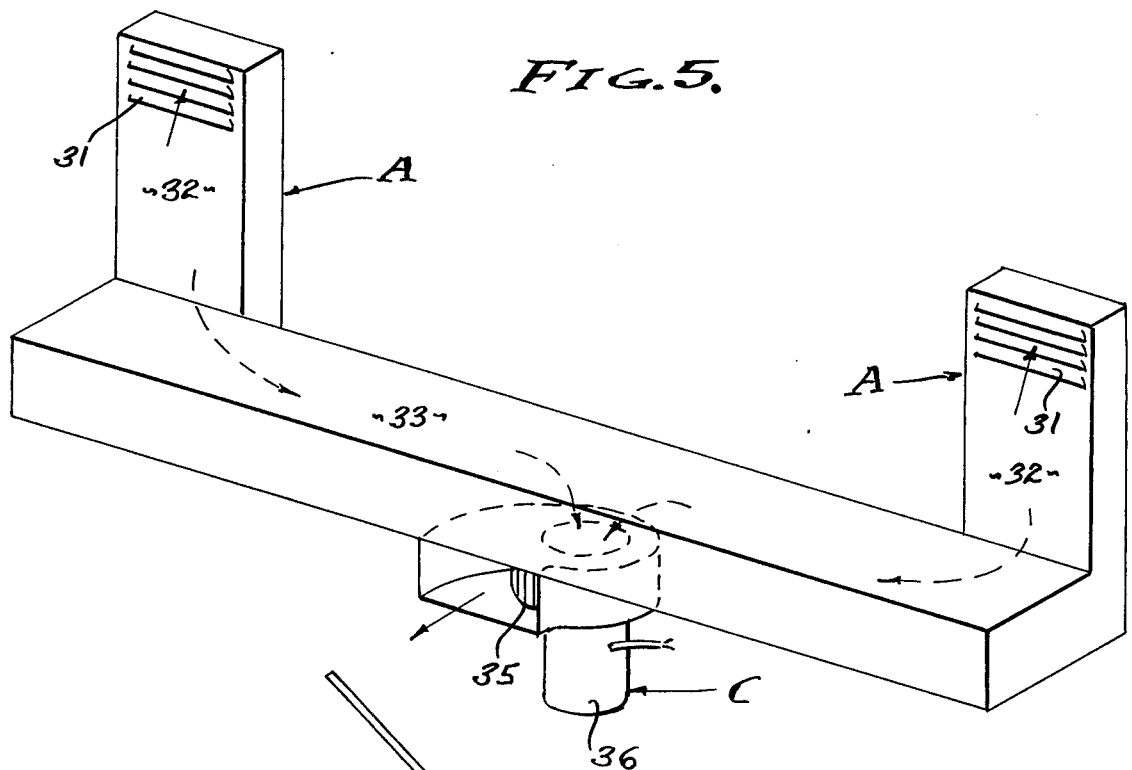
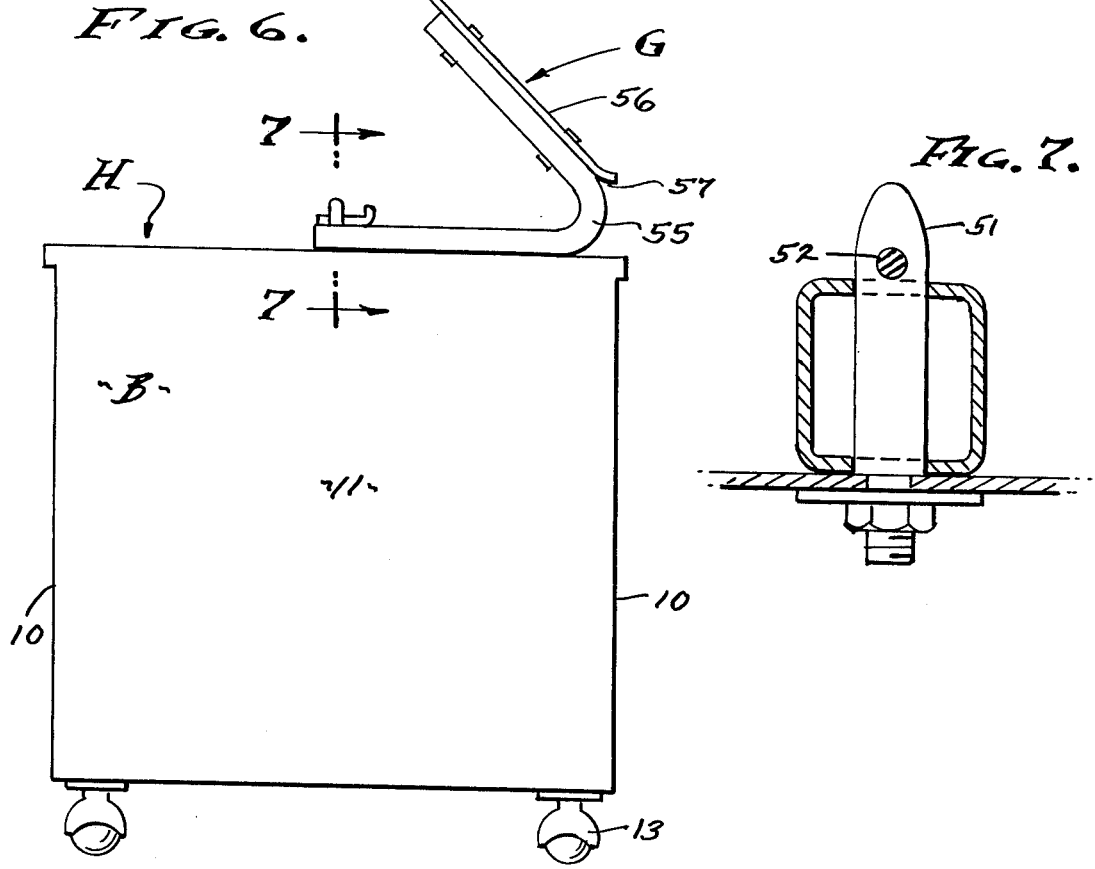

SYSTEM AND HOT CABINET SERVER

BACKGROUND

This invention relates to systemized food serving for institutional use in feeding large numbers of people during peak-feeding periods, for example in schools, industry, sports, hospitals, etc. Mass feeding of properly prepared and conditioned foods is a problem where the numbers of persons to be served is large and the time period therefor small. Furthermore, the preparation of "a la carte" serving requires refrigerated, ambient, and oven temperatures to be applied and maintained, there being "pre-dished", "pre-portioned", and pre-packaged foods that are to be conditioned for serving by this system which includes therein the Hot Cabinet of the present invention. Generally, the system involves a cooperative arrangement of sequentially continuing cabinets, including a refrigerated cabinet R, a frozen cabinet F, a merchandizing cabinet M, and the Hot Cabinet H hereinafter described and claimed. These cooperative cabinets are of identical height and width configuration and are abutted in end to end relationship for self-serving from both sides. Pre-packaged foods, at hot, cold or room temperature, transported from a commissary or central kitchen or the like are placed in the cabinets and brought to proper temperature for serving. For example, students serve themselves from lines at both sides of the cabinets, effecting speed and volume handling, and each cabinet arrangement must serve approximately 450 students in about 15 minutes without reloading, the system arrangement shown herein having this capacity. Thus, capacity requirements can be predicted with accuracy according to the daily attendance and number of serving periods. The system is completely mobile so as to be set up and/or dismantled or stored with minimum effort, and requires no plumbing or venting, etc. The only requirement is the input of electrical power, and that is minimized by the combined convection, conduction, and recirculation of air with minimum loss. Pilfering and contamination is prevented by systemized covers and sneeze guards that are secured in operative position by common lock bar anchors, and all of which ensures profitable food distribution under sanitary conditions. The Hot Cabinet H includes all of these features.

It is an object of this invention to provide rapid serving of foods in three general categories; namely, refrigerated, frozen and hot pre-packaged foods. The service lines for this purpose must be adapted to varied situations and circumstances, and varied in configuration according to demand as related to the ratio and quantities of the aforementioned categories of foods to be served. For example on cold days an abundance of hot foods is preferred, in which case the service lines are augmented by additional Hot Cabinets, each of which is self-sufficient as are the cooperatively arranged refrigerated cabinets R, frozen cabinets F and merchandising cabinets M. With the present invention, these cooperative cabinets are of identical height and width configuration and are all "bin type" cabinets adapted to carry trays of pre-packaged foods. Practicality of this system resides in the mobility of the individual cabinets which are on casters or wheeled supports, whereby the service line can be quickly erected, modified or broken down for storage, and all the while each unit or cabinet can remain in operation.

The bin type Hot Cabinet of the present invention is essentially an oven capable of bringing prepackaged foods to serving temperature and/or maintaining them at a serving temperature. As is well known, heat tends to rise, especially within the confines of the corners of such cabinets, and it is to this end that I have discovered means to efficiently operate such bin type cabinets substantially without the loss of heat, by the combined utilization of convection, conduction, and recirculation principles applied to optimum advantage. With the present invention, a food well is completely surrounded by a plenum distributing heated air that is recirculated by a blower means drawing from corners of the well and delivering said air through heater means that discharges hot air into said plenum.

SUMMARY OF THE INVENTION

The Hot Cabinet H herein disclosed is a bin type heating oven that operates on the principles of convection, conduction and recirculation, all of which is implemented by combined means advantageously utilizing said principles. Generally, the Hot Cabinet H involves a three dimensional rectangular body B within which there is a depending well W in spaced relation thereto establishing a coextensive plenum P, there being induction means A at the corners of the well recirculating heated air through blower means C and through heater means D for discharge through the plenum and into the well. The structure is sheet metal with reinforcements as required, is completely self-contained and preferably electrically powered. The Hot Cabinet H is of counter-top height with the well bottom spaced substantially above the floor level, with heater means D and related blower means C and induction means A housed within concealing lower aprons of the body B.

DRAWINGS

The various objects and features of this invention will be fully understood from the following detailed description of the typical preferred form and application thereof, throughout which description reference is made to the accompanying drawings, in which:

FIG. 1 is a perspective view of the feeding system which involves the Hot Cabinet.

FIG. 2 is a transverse section taken as indicated by line 2—2 on FIG. 1, with the covers locked in position.

FIG. 3 is a view similar to FIG. 2, a transverse sectional view taken as indicated by line 3—3 on FIG. 1.

FIG. 4 is a longitudinal sectional view taken as indicated by line 4—4 on FIG. 2.

FIG. 5 is a perspective view of the air induction and blower means, separated from the surrounding structure.

FIG. 6 is an end view of the Hot Cabinet showing a super-structure replacing the lock bar, and FIG. 7 is an enlarged detailed sectional view taken as indicated by line 7—7 on FIG. 6.

PREFERRED EMBODIMENT

Referring now to the drawings, the body B is an elongated rectangular housing of substantial size; nominally 34 inches high (from the floor), 30 inches in width, and 62 inches in length. In practice, the body is a sheet metal structure having flat and parallel side and end panels 10 and 11 that are vertically disposed; the lower edges of which are reinforced by a frame 12 supported at its four corners by wheeled casters 13 or the like.

The upper edges of the panels 10 and 11 are capped by a rail 14 having double steps 15 and 15' adapted to support upper and lower covers 16 and 17 that are slideable thereon and/or removeable therefrom. Each cover 16 and 17 is a sheet metal envelope with spaced planar top and bottom faces containing insulation therebetween, and adapted to overlap at the center of the cabinet when engaged with opposite ends thereof respectively. The bottom 18 of the cabinet is spaced substantially above the floor and is horizontally disposed with a central opening 19 therethrough. In accordance with this invention, the outer panels of the body are insulated so as to prevent heat transfer from the interior, and to this end a liner comprised of side and end walls 21 and 22 and a bottom 23, is provided in spaced relation and complementary to the sides and ends 10 and 11 and bottom 18 with insulation 24 between said panels and said walls.

In accordance with this invention, the well W is disposed to depend within the above described insulated body B in spaced relation to the insulated walls thereof, so as to establish the plenum P. Therefore, the well is comprised of sides and ends 25 and 26, with a bottom 27 disposed in spaced parallel relation to the sides and ends and bottom walls 21, 22 and 23 respectively. In carrying out this invention, the sides and ends of the well are integral depending continuations of the rails 14, with rounded fillets joining the same integrally with the bottom 27 thereof. Thus, the plenum P is coextensive with both the bin formation of the body B and with the complementary bin formation of the well W. In practice the well W is spaced inwardly approximately three inches from the liner walls.

A feature of this invention is the recirculation of heated air and conduction of its heat energy into the well W and its contents, by induction and the discriminate location of ventilation louvers 30 and 31. As will be later described, heated air is charged into the plenum P by the heater means D, flooding the plenum at a temperature somewhat in excess of the temperature to be established within the well. It will be observed that the sides 21, ends 22 and bottom 23 of the well are imperforate sheet metal members that have coextensive interface contact with the heated air within the plenum, and direct heat absorption is achieved therethrough to be dispersed within the well by the principles of conduction. In accordance with this invention, the heated air is dynamic and maintained as a moving column discharged into the well W and thereafter retrieved by the induction means A. The said dynamic column of air flows into the plenum P through opening 19 where it spreads out in omni directions to rise thermally at the side and end walls spaced from the plenum. Discharge of the heated air from the plenum P is at the upper margin thereof and preferably along the opposite sides of the cabinet body immediately below the rails 14. In practice, the heated air is directed or nozzled downwardly and inwardly into the well W as by means of downwardly turned vanes of the louvers 30 extending substantially from end to end of the well. Consequently, the discharged heated air is played downwardly into the well W and its contents to heat the same by the absorption of heat energy therefrom.

Another feature of this invention is the induction means A which directs the heated air as a dynamically moving column into the blower means C. A phenomenon of the bin type oven characterized by its three dimensional rectangular well W, is the convection current rise of heated air at the vertically disposed corners thereof where the sides 21 and ends 22 adjoin. At the juncture of side 21 and ends 22 there is a concentrated flow action which is induced by the louvers 31 of induction means A, drawing air at the upper margin of at least one side 21, as shown. In practice, the louver 31 comprises downwardly turned vanes that inversely draw air upwardly and inwardly into a duct 32 that depends at each of the two ends of the cabinet body to open into a header 33 that feeds the air into the blower means D at the center of the cabinet body and located beneath bottom 18.

The blower means C can vary widely and is essentially an air pump. As shown, there is a centrifugal fan 35 driven by an electric motor 36 drawing air from the header 33 and delivering the same into a heater box 43 next to be described. The motor is in a power circuit controlled by a thermostat responsive to a sensor 37 located within the plenum P.

The heater means D can vary widely and is preferably one or more electrical resistance elements 40 consisting of nichrome wire imbedded in magnesium oxide powder encased in a tubular stainless steel sheath. The said sheath is finned for rapid heat dissipation, and its opposite terminal ends are carried by insulators 42 secured to a surrounding box 43 into which the blower means C discharges and that openly communicates into plenum P through opening 19. Electrical conductors 45 extend to a control center 46 energized and/or deenergized by the thermostat responsive to sensor 37.

From the foregoing it will be seen that I have provided an efficient Hot Cabinet H that conserves the heat energy transfer into the dynamic column of air for absorption by the contents (not shown) within the well W. It is to be understood that various types and styles of trays and/or baskets (not shown) can be employed as indicated to display the pre-packaged foods for acquisition by lines of customers passing along either side of the cabinet. The downward discharge from louvers 30 circulates heated air into the bottom of the well W while the upward convection of air at opposite corners of the well is induced into the ducts 32 for recirculation. As a result, little air is lost while the greater part thereof is moved through the heater means D and brought up to temperature as may be required.

Referring now to the closure of the Hot Cabinet H and the installation thereon of a super-structure in the form of the sneeze guard G, the covers 16 and 17 are to be captured beneath a closely positioned lock bar 50 removeably supported upon the end rails 14 and held positioned on the center plane of the cabinet body B by a pair of mounting pins 51, one projecting vertically from each opposite end rail. Depending pins 49 project from the bar 50 to engage in lock openings in the two covers 16 and 17. In accordance with this invention, each pin 51 has a horizontal lock opening 52 spaced from the supporting rail and through which the shackle of a packlock 53 is passed, or any like fastening device. In lieu of the lock bar installation, a pair of upstanding brackets 55 are supported over said pins and between which a horizontally extending panel 56 is suspended, preferably a transparent panel of acrylic plastic of substantial vertical extend with its lower edge 57 spaced above the side rail for customer access to withdraw the pre-packaged foods as may be desired.

Having described only a typical preferred form and application of my invention, I do not wish to be limited or restricted to the specific details herein set forth, but wish to reserve to myself any modifications or variations that may appear to those skilled in the art:

Having described my invention, I claim:

1. A Hot Cabinet for conditioning pre-packaged foods and the like and to maintain the same at predetermined temperature and including; a bin type cabinet body with insulated outer panels, an upwardly open well complementary to and depending into the body in spaced relation to the outer panels thereof forming a plenum therebetween, the bin type cabinet and complementary well being of rectangular three dimensional configuration, and air tempering means comprised of inlets at the upper peripheral corners of the well inducing air from the well and through temperature responsive heating means and vented to discharge the same through said plenum and into the well for recirculation.

2. The Hot Cabinet for conditioning and maintaining the temperature of prepackaged foods and the like as set forth in claim 1, wherein the complementary well is vented with downwardly disposed nozzles along its upper periphery for discharge of heated air into the well.

3. The Hot Cabinet for conditioning and maintaining the temperature of pre-packaged foods and the like as set forth in claim 1, wherein the complementary well is heat conductive for the absorption of heat from the heated air discharged through the plenum and is vented with downwardly disposed nozzles along its upper periphery for discharge of heated air into the well.

4. A Hot Cabinet for conditioning pre-packaged foods and the like and to maintain the same at a predetermined temperature and including; a bin type cabinet body of three dimensional rectangular configuration with corner related side and end and bottom panels, an upwardly open well complementary to and depending into the body in spaced relation to the side and end and bottom panels thereof and forming a plenum therebetween, there being a central opening through the said bottom panel, a temperature responsive heating means in open communication with the plenum through said central opening, and means inducing air from the corners of the well and discharging the same from the sides of the well and thereinto for recirculation.

5. The Hot Cabinet for conditioning and maintaining the temperature of pre-packaged foods and the like as set forth in claim 4, wherein the complementary well is heat conductive for absorption of heat from the heated air discharged through the plenum.

6. The Hot Cabinet for conditioning and maintaining the temperature of pre-packaged foods and the like as set forth in claim 4, wherein the complementary well is vented along its upper periphery for discharge of heated air into the well.

7. The Hot Cabinet for conditioning and maintaining the temperature of pre-packaged foods and the like as set forth in claim 4, wherein the complementary well is vented with downwardly disposed nozzles along its upper periphery for discharge of heated air into the well.

8. The Hot Cabinet for conditioning and maintaining the temperature of pre-packaged foods and the like as set forth in claim 4, wherein the means inducing air from the corners of the well comprises vents at the upper periphery of the well.

9. The Hot Cabinet for conditioning and maintaining the temperature of pre-packaged foods and the like as set forth in claim 4, wherein the complementary well is vented along its upper periphery for discharge of heated air into the well, and wherein the means inducing air from the corners of the well comprises vents at the upper periphery of the well.

10. The Hot Cabinet for conditioning and maintaining the temperature of pre-packaged foods and the like as set forth in claim 4, wherein the complementary well is vented with downwardly disposed nozzles along its upper periphery for discharge of heated air into the well, and wherein the means inducing air from the corners of the well comprises vents at the upper periphery of the well.

11. The Hot Cabinet for conditioning and maintaining the temperature of pre-packaged foods and the like as set forth in claim 4, wherein the complementary well is heat conductive for absorption of heat from the heated air discharged through the plenum, wherein the complementary well is vented along its upper periphery for discharge of heated air into the well, and wherein the means inducing air from the corners of the well comprises vents at the upper periphery of the well.

12. The Hot Cabinet for conditioning and maintaining the temperature of pre-packaged foods and the like as set forth in claim 4, wherein the complementary well is heat conductive for absorption of heat from the heated air discharged through the plenum, wherein the complementary well is vented with downwardly disposed nozzles along its upper periphery for discharge of heated air into the well, and wherein the means inducing air from the corners of the well comprises vents at the upper periphery of the well.

* * * * *